US009800605B2

(12) United States Patent
Baikalov et al.

(10) Patent No.: US 9,800,605 B2
(45) Date of Patent: Oct. 24, 2017

(54) RISK SCORING FOR THREAT ASSESSMENT (71) Applicant: Securonix, Inc., Los Angeles, CA (US)

(72) Inventors: Igor A. Baikalov, Thousand Oaks, CA (US); Tanuj Gulati, Carrollton, TX (US); Sachin Nayyar, Los Angeles, CA (US); Anjaneya Shenoy, Addison, TX (US); Ganpatrao H. Patwardhan, Portland, OR (US)

(73) Assignee: Securonix, Inc., Los Angeles, CA (US)

( * ) Notice: Subject to any disclaimer, the term of this patent is extended or adjusted under 35 U.S.C. 154(b) by 108 days.

(21) Appl. No.: 14/928,773

(22) Filed: Oct. 30, 2015

(65) Prior Publication Data
US 2016/0226905 A1 Aug. 4, 2016

Related U.S. Application Data (60) Provisional application No. 62/110,031, filed on Jan. 30, 2015.

(51) Int. Cl.
*H04L 29/06* (2006.01)
(52) U.S. Cl.
CPC ...... *H04L 63/1433* (2013.01); *H04L 63/1408* (2013.01)
(58) Field of Classification Search
CPC .................. H04L 63/1433; H04L 63/1408
See application file for complete search history.

(56) References Cited

U.S. PATENT DOCUMENTS

| 6,983,221 | B2* | 1/2006 | Tracy ................... | G06F 21/577 702/108 |
| 7,552,480 | B1* | 6/2009 | Voss ..................... | G06F 21/577 380/277 |
| 8,595,845 | B2* | 11/2013 | Basavapatna ......... | G06F 21/577 705/38 |
| 9,516,041 | B2* | 12/2016 | Baikalov ............. | H04L 63/1408 |
| 2004/0102922 | A1* | 5/2004 | Tracy ................... | G06F 21/577 702/181 |
| 2004/0168086 | A1* | 8/2004 | Young ................... | G06Q 10/00 726/25 |
| 2005/0004863 | A1* | 1/2005 | Havrilak ............. | G06Q 30/018 705/38 |

(Continued)

OTHER PUBLICATIONS

Perdisci, R. "McPAD: A Multiple Classifier System for Accurate Payload Detection", Elsevier Science, Oct. 23, 2008.

(Continued)

*Primary Examiner* — Hosuk Song
*Assistant Examiner* — J. Brant Murphy
(74) *Attorney, Agent, or Firm* — Barry N. Young (57) ABSTRACT

Threat risks to an enterprise are detected and assessed by assembling singular threats identified using both direct and behavioral threat indicators into composite threats to create complex use cases across multiple domains, and to amplify risks along kill chains of known attacks for early detection. Composite threat risk scores are computed from risk scores of singular threats to exponentially increase with the number of events observed along the kill chain. Composite threats are combined with normalized values of static risk and inherent risk for an entity of the enterprise to produce an entity risk score representative of the overall risk to the entity.

17 Claims, 5 Drawing Sheets

(56) References Cited

U.S. PATENT DOCUMENTS

| | | | |
|---|---|---|---|
| 2005/0043961 A1* | 2/2005 | Torres | G06F 21/55 705/35 |
| 2007/0113281 A1* | 5/2007 | Leach | G06Q 40/08 726/22 |
| 2010/0137367 A1* | 6/2010 | Ha | C07D 401/12 514/318 |
| 2013/0097709 A1* | 4/2013 | Basavapatna | G06F 21/552 726/25 |
| 2013/0191919 A1* | 7/2013 | Basavapatna | G06F 21/577 726/25 |
| 2013/0298243 A1* | 11/2013 | Kumar | G06F 21/52 726/25 |
| 2014/0007244 A1* | 1/2014 | Martin | G06F 21/577 726/25 |
| 2014/0046863 A1* | 2/2014 | Gifford | G06Q 50/265 705/325 |
| 2014/0137257 A1* | 5/2014 | Martinez | H04L 63/1433 726/25 |
| 2014/0237545 A1* | 8/2014 | Mylavarapu | H04L 63/1433 726/3 |
| 2015/0033337 A1* | 1/2015 | Baikalov | H04L 63/1408 726/23 |
| 2015/0163242 A1* | 6/2015 | Laidlaw | G06F 21/552 726/22 |
| 2015/0205954 A1* | 7/2015 | Jou | G06F 21/316 726/22 |
| 2015/0373043 A1* | 12/2015 | Wang | G06F 21/552 706/12 |
| 2016/0127407 A1* | 5/2016 | Mankovskii | H04L 63/1433 726/1 |
| 2016/0171415 A1* | 6/2016 | Yampolskiy | H04L 63/1433 705/7.28 |
| 2016/0197943 A1* | 7/2016 | Momot | H04L 63/1433 726/23 |
| 2016/0205126 A1* | 7/2016 | Boyer | H04L 63/1433 726/25 |

OTHER PUBLICATIONS

Wang, K. "Anomalous Payload-Based Network Intrusion Detection", Columbia University, RAID Sep. 2004.

* cited by examiner

| User ID | Threat Indicator Threat Scores ($P_T$) ||||| $R_C$ Risk Score |
| | (612) Failed Logins | (614) Anomalous Access | (616) Data Consumption | (618) Proxy Blocks | (620) Data Egress | |
| --- | --- | --- | --- | --- | --- | --- |
| User 1 | 0.00 | 0.02 | 0.00 | 0.00 | 0.10 | 0.12 |
| User 2 | 0.95 | 0.00 | 0.00 | 0.02 | 0.00 | 0.99 |
| User 3 | 0.87 | 0.69 | 0.34 | 0.00 | 0.74 | 6.37 |
| User 4 | 0.98 | 1.00 | 0.89 | 0.96 | 0.91 | 27.02 |

RISK SCORING FOR THREAT ASSESSMENT

CROSS-REFERENCE TO RELATED APPLICATIONS

This application claims the benefit of U.S. Application No. 62/110,031, filed Jan. 30, 2015, the disclosure of which is incorporated by reference herein.

BACKGROUND

This invention related generally to systems and methods for detecting and preventing internal and external threats to technology infrastructure, information assets and intellectual property of enterprises and other organizations, and more particularly to assessing threats based on a mix of behavioral and direct indicators.

The rapid detection of security threats is critical for organizations to prevent compromise of their computer systems, data, networks and applications. Organizations, whether commercial, educational or governmental, and other enterprises store and transfer the majority of their data in digital form in computer systems and databases. Much of this data is valuable confidential commercial information such as business plans or trade secret information, or private information about individual employees or members that is not intended for public view, and any exposure or manipulation of this information could cause the organization or employees great financial or reputational damage. Organizations are frequently challenged by the attacks that involve fraud, data destruction or theft, intellectual property theft, or national security implications. Some attackers may be backed by nation states or groups with political agendas and apply more sinister attacks intended to gain control of or to damage critical infrastructures.

Organizations typically employ a multi-layered network topology that separates various components of their IT infrastructure from the Internet or other external networks. Internal network workstations and servers are generally protected from direct attack from external sources by network proxy servers; external network traffic is typically terminated by such servers at "demilitarized network zones" (DMZ); and the incoming traffic is filtered through a firewall. External attackers normally attempt to penetrate an organization's defenses that are set up at the organization's network perimeter, and many security approaches attempt to prevent network access by such external attacks. Once external attackers breach the network perimeter and get onto the internal network, they become much more difficult to detect and defend against. They may unleash malware or attempt to access internal data, and typically operate under the guise of an internal user by either hijacking an existing user's account or by creating a new user account. Inside attackers are more insidious and pose threats that are more difficult to detect and defend against because the inside attackers are perceived to be rightful users of the organization's computer network systems. They may have legitimate IT accounts, and their unauthorized and illicit activities may generally fall within authorized areas of responsibility for insiders, but otherwise exceed what is normal behavior. For instance, illicit behavior by an employee customer service representative such as granting a customer an inappropriately large refund, or by an insider accessing and manipulating customer information or other sensitive data may be difficult to detect as a threat.

Many approaches to external threat detection utilize signatures of known attacks to identify and create models for providing alerts upon detecting activities having similar signatures. In order to define signatures for any new threats, the underlying components of the associated threat vectors must be studied in detail and signatures of these threat vectors must be made available to a threat detection system. There are several major shortcomings of these signature-based threat detection approaches. The development of signatures for new threats requires an in-depth analysis on an infected system, which is time consuming and resource intensive, and may be too slow to address quickly evolving threats. Signatures also do not adapt well to changes in threat vectors. Moreover, signature-based defenses cannot protect against zero-day attacks that exploit previously unknown vulnerabilities, and are ineffective for detecting insider threats originating from within an organization.

Identifying insider attacks typically involves constructing various profiles for the normal behaviors of insiders, detecting anomalous deviations from these profiles, and estimating the probabilities of threat risks of these anomalies. However, constructing profiles that accurately characterize normal insider behavior is difficult and an inexact art. Moreover, organizations in different industries may have different profile models for behavior considered normal. For example, the health care industry has models for normal activities that are different from those for the financial and retail industries due to inherent differences between the industries. Applying the same profile models to different industries can lead to false results. Moreover, many profiles are constructed using statistical approaches for observables that are assumed often incorrectly to be normally distributed when they are not. Using such profiles for detecting anomalies that represent possible threats can produce erroneous results and lead to many false positive alerts that can overwhelm security analysts. Balancing between the risk of missing an actual threat by using high confidence levels for detection to minimize false positives and using an overly permissive approach that floods security analysts with alerts is a difficult trade-off.

There is a need for systems and methods that address these and other known problems in reliably detecting, evaluating and assessing threat risks to protect organizations from data breaches, attacks and other injuries. In particular, there is a need for more accurate threat modeling and risk evaluation approaches that reliably identify threats and evaluate threat risks within an organization's IT infrastructure while minimizing false positive alerts. It is to these ends that this invention is directed.

SUMMARY OF THE INVENTION

The invention addresses the foregoing and other problems of detecting and assessing threat risks to organizations through a multi-tiered hierarchical process that aggregates threats in order of increasing complexity into composite threat risks to complex use cases across multiple domains, and amplifies risks to enhance risk detection along kill chains that afford early detection of an attack before serious damage can be done. Threat indicators may be quantified using a risk scoring process that assigns a threat risk score to each indicator to enable the different indicators to be aggregated into composite risks and assessed.

In one aspect of the invention, a system and a method are provided in which direct and behavioral threat indicators are combined to indicate various different singular threats, and the various singular threats are combined to provide composite threat indications for complex use cases for detecting composite threats. A composite risk score is determined for a composite threat, and used to detect a possible attack by comparing the composite risk score to a predetermined threshold. Composite and singular threats are aggregated to create complex use cases across multiple domains to amplify risks along a kill chain to increase the likelihood of early detection of an attack.

In other aspects, the invention classifies and normalizes entity risk scores for different entities and at different levels of the enterprise to enable comparison of the risks associated with different entities, and aggregates the entity risks to determine organizational risk scores for different departments, divisions and groups of the enterprise.

A process in accordance with the invention may be embodied in executable instructions in computer readable physical media that control the operations of one or more computers in the computer network infrastructure of an enterprise.

DESCRIPTION OF PREFERRED EMBODIMENTS

Applicant's prior U.S. application Ser. No. 14/811,732, filed Jul. 28, 2015, the disclosure of which is incorporated by reference herein, is directed to identifying threats to an enterprise by detecting anomalous behaviors of individuals operating within the IT infrastructure (computer network) of the enterprise by comparing their behaviors to behavioral profiles to detect anomalies that indicate a possible threat. This invention extends the invention of said prior application by identifying, evaluating and assessing events and behaviors assembling both behavioral indicators and direct indicators to form composite threat risks, and by quantifying (scoring) the composite threat risks in ways that enhance the detection of actual threats and that enable risks for different types of threats and for different entities and organizations to be assessed and compared.

Figure 1:
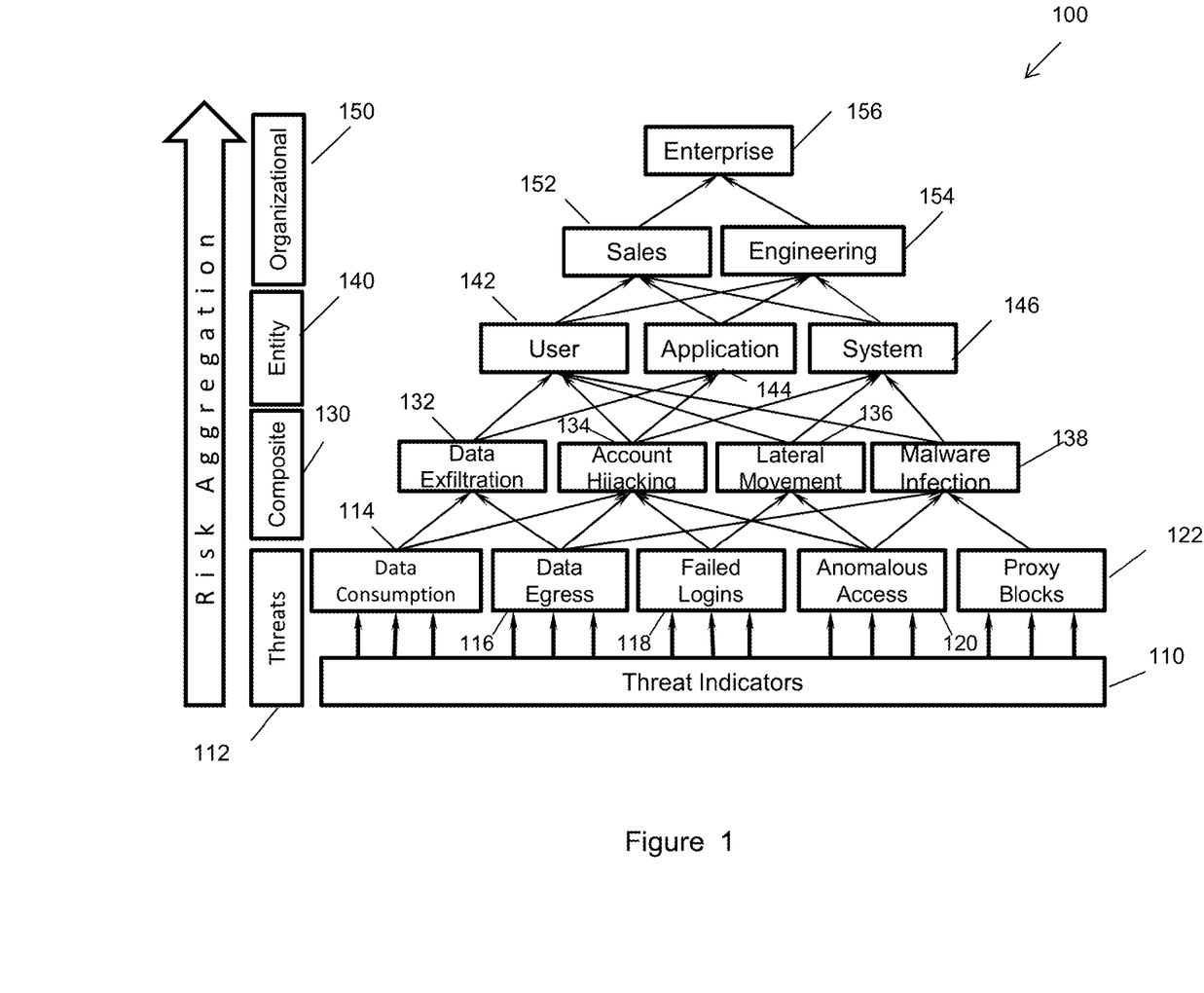
FIG. 1 is a diagrammatic overview of a multi-tiered hierarchical risk aggregation and assessment process in accordance with the invention.

FIG. 1 is a diagrammatic view of a multi-tiered hierarchical risk aggregation and evaluation process 100 in accordance with an embodiment of the invention. The figure represents a model that illustrates how selected risks within the IT (computer network) infrastructure of an organization are aggregated in order of increasing complexity for threat detection. At 110, a plurality of behavioral and direct threat indicators combine to represent pluralities of singular threats 112. Threat indicators comprise events and activities that are indicative of possible threats. Behavioral indicators comprise activities such as anomalous behaviors that have some probability of being an actual threat, as described in said above referenced U.S. application Ser. No. 14/811,732. Direct indicators may be events or activities that are indicative of known threats, such as files containing viruses or other malware, and may be based upon cyber threat intelligence feeds of cyber threat detection organizations that detect, study and assess cyber threats, and provide information as to their detection and prevention. As shown in FIG. 1, these threat indicator events and activities may comprise, for instance, data consumption 114, data egress 116 where data is sent out, failed logins 118, anomalous accesses 120 and proxy blocks 122, among others. The singular occurrence of one or more of such events and activities in isolation may be normal and innocent, such as a failed login or an unauthorized attempt to access a file, but in combinations or upon multiple occurrences the events and activities present an increased risk and may well represent an actual attack.

At the next level of the hierarchy the singular threats 112 are combined to form composite threats 130 and complex use cases across multiple domains, as will be described in more detail below. Composite threats comprise more complex combinations of singular actions and events that are more strongly indicative of likely threats. They may comprise, for instance, data exfiltration (unauthorized data removal or theft) 132, account hijacking 134, lateral movement of data 136, and malware infection 138. Possible combinations of singular threats that may form composite threats are indicated in the figure by the arrows. For example, data consumption 114 and data egress 116 may combine to create the threat of data exfiltration 132, whereas data egress 116, anomalous access 120 and proxy blocks 122 may combine to create the threat of malware infection 138.

At the next level, entity risks 140 may be determined, as will be described in more detail below, by aggregating, as shown, dynamic threat risks from singular threats 112 and composite threats 130 attributed to a specific entity, such as a user 142, an application 144, or a system 146. Entity risks may further be aggregated to determine the organizational risk 150 for departments or groups such as sales 152 and engineering 154 within the organization, as well as for the enterprise 156 itself.

Figure 2:
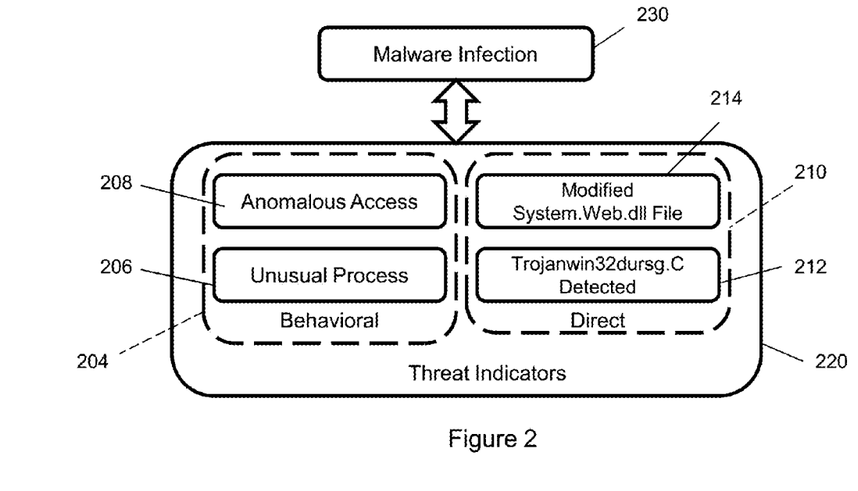
FIG. 2 is a diagrammatic view illustrating a method in accordance with an embodiment of the invention for combining behavioral and direct threat indicators to indicate a threat.

FIG. 2 illustrates an example of combining behavioral and direct indicators to indicate a composite threat risk. Combining behavioral and direct indicators to determine composite risk is advantageous in several ways. It provides greater synergy by aggregating information about a threat from different indicators to amplify a threat risk. This affords earlier detection of serious threats, and reduces the occurrences of false positives, to which behavioral indicators are prone. Referring to FIG. 2, behavioral indicators 204 comprising, for example, an unusual process action 206 and an anomalous access action 208 may be combined with direct indicators 210 comprising a detected virus 212 and a modified system file 214 to form a threat indicator 220 that indicates a possible threat 230 such as a malware infection. Behavioral indicators have an anomaly probability, $P_I$, that is generally less than 1.0, as described in said prior application, and this anomaly probability represents the likelihood of a behavioral indicator being a threat, whereas direct indicators that are known to represent actual threats have probability $P_I=1.0$. Where there are multiple behavioral and direct indicators that may be indicative of an actual threat, some indicators may be more important and more critical than others in indicating the threat. If only some of the indicators but not all are observed, a method is needed to quantify and assess the risk that the observed combination represents. The invention affords a method for accomplishing this by enabling risk scores to be determined for each threat indicator, and by enabling the risk scores to be aggregated and combined to determine a composite threat score as a weighted probability of all associated threat indicators, as will be described below.

Figure 3:
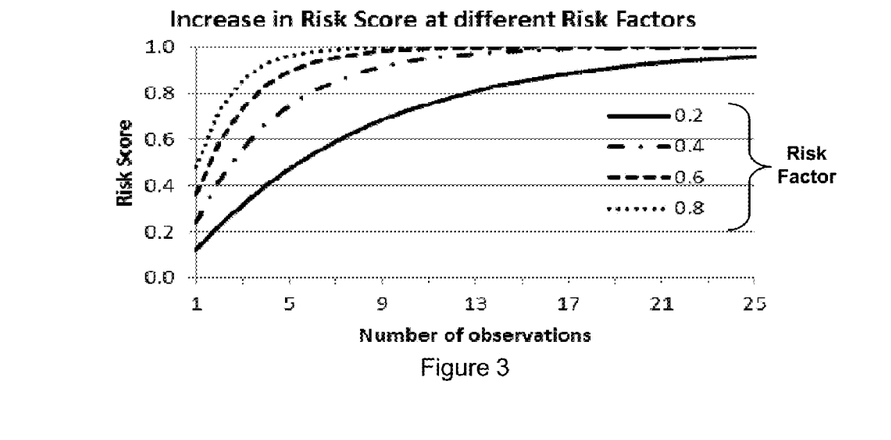
FIG. 3 is a plot illustrating how threat risk scores are determined as a function of the number of occurrences of events or activities for different risk factors.

In accordance with the invention, threat indicators can be quantified to create risk scores for each specific threat such that they may be combined in meaningful ways to create topical and cumulative threat scores. Each threat indicator may be assigned a risk factor, $f_I$, for a specific threat based, for instance, upon metadata for the type of threat to which the risk factor is assigned. For example, a failed login happens to everyone occasionally, and a single occurrence of a failed login is not necessarily indicative of a threat. Therefore, a failed login event may be assigned a risk factor such as 0.3 meaning that based upon empirical metadata for a single failed login there is a 30% probability that it represents an actual threat. However, if instead ten failed login events are observed, while this is also possibly normal, it is less likely that this number of failed logins is due to chance. In this instance, it may be appropriate that a risk score of 0.8 be assigned to the threat, representing an 80% chance that these events are due to malicious activity. Thus, the risk score that is determined for this particular threat indicator is based not only on its risk factor, but also is a function of the number of occurrences of events represented by the threat indicator. This is illustrated in FIG. 3 which depicts a series of curves showing the increase in risk score at different risk factors as a function of the number of observations. As shown, the higher the risk factor, the faster the risk score increases with the number of observations.

In FIG. 2, the behavioral threat indicator "Unusual Process" 206 may be assigned a risk factor $f_I=0.7$, for example, for the specific threat "Malware Infection" 230, but be assigned only a risk factor $f_I=0.5$ for a "System Compromise" specific threat, reflecting the fact that from experience a system compromise due to an unusual process is less likely to indicate a threat. In addition, as previously described, each behavioral indicator has an associated anomaly probability between 0 and 1.0 and each direct indicator has a probability equal to 1.0. These probabilities must be taken into consideration in determining an overall or cumulative risk score to quantify an associated threat. In an embodiment, a cumulative threat score, $P_T$, may be calculated as the weighted probability of all associated threat indicators, $P_I$, together with an aged previous threat score, $P_D$, that is aged by an appropriate decay or aging factor, $f_D$, as:

$$P_T=1-(1-f_D P_D)\pi_I(1-f_I P_I)$$

Each threat may have a different aging factor that may be selected empirically based upon the type of threat, previous observations and other information such as experience with the particular type of threat. Effectively, the aging factor decreases the weight accorded to historical determinations of threat score to avoid overly biasing a current risk score determination with the scores for previous threats which may have been based upon different conditions and different threat indicators. For some threats, the aging factor, $f_D$, may be zero, in which case the threat score becomes a topical (current) threat score, $\dot{P}_T$:

$$\dot{P}_T=1-\pi_I(1-F_I P_I).$$

As noted earlier, the threat score depends upon the number of events observed. Accordingly, a large number of low-risk anomalies may result in a high risk score.

Combining singular threats to create composite threats for complex use cases across multiple domains creates a kill chain that facilitates the detection of threats. By creating a kill chain comprising a sequence of events that represent composite threats in the order in which they would occur in an attack, risks along the kill chain are amplified which affords earlier prediction and detection of threats. By complex use cases across multiple domains is meant being able to correlate multiple different threats that may not be directly related but combine to indicate a possible threat that otherwise may go undetected. For instance, in an email channel traditional security tools that look for phishing emails may not alone generate a sufficiently high probability to warrant an alarm. However, when combined with indicators from other domains such as the findings from anti-virus software or other malware scanners, the ability to detect the threat can be enhanced. The ability afforded by the invention of creating different risk models by combining different types of risks to create composite risks scores for more complex use cases and for more complicated attacks is something that previously was unavailable and is particularly advantageous. As will be described in more detail below, this also affords particularized threat detection models tailored for different industries and different market segments that permit more accurate identification and characterization of threat risks, which substantially reduce false positives.

Figure 4:
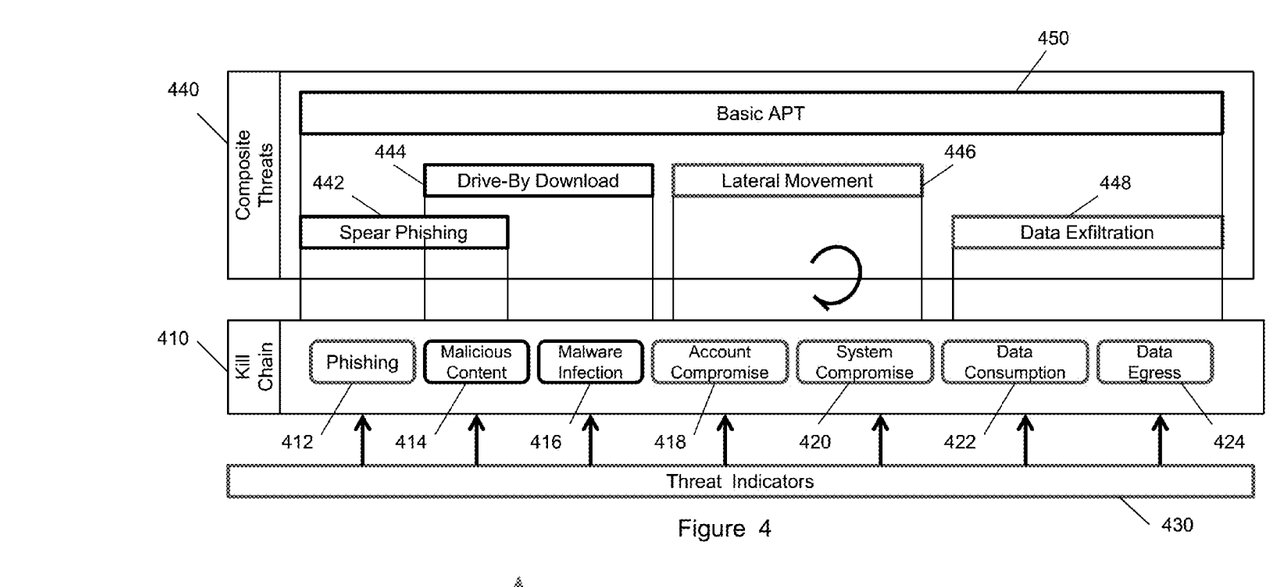
FIG. 4 is a diagrammatic view illustrating a method in accordance with the invention of combining singular risks to create a model of composite risks for complex use cases across multiple domains.

FIG. 4 is an example of one such particularized threat detection model. The figure illustrates a method in accordance with the invention for combining singular threats to create composite threats for complex use cases across multiple domains, and for creating a kill chain comprising a sequence of events that reflects the order in which the events would occur in an attack, and for amplifying the risk along the kill chain of known attacks to afford earlier prediction and detection. The longer the kill chain, the greater its predictive capability, since the amplified risk indications from events earlier in the chain enable an attack to be detected and stopped before major damage is done at later stages.

A composite risk score, $R_C$, may be computed from the cumulative threat scores, $P_T$, determined as indicated above to exponentially increase with the number of threats observed along the kill chain as:

$$R_C=\pi_T(1+P_T)-1$$

The composite risk score combines risk scores of all threats in the composite threat in a manner that exponentially amplifies resulting score if there is more than one non-zero risk score.

In FIG. 4, a kill chain 410 comprising a plurality of singular threats such as phishing 412, malicious content 414, malware infection 416, account compromise 418, system compromise 420, data consumption 422 and data egress 424 may be formed. Together the singular threats represent a sequence of events that comprise composite threats 440. These singular threats may be based upon combinations of behavioral and direct threat indicators 430, and may be combined to produce the composite threats shown. As shown, phishing 412 and malicious content 414 may combine to create the composite threat spear phishing 442. Malicious content 414 and malware infection 416 may combine to create the composite threat drive-by download 444. Account compromise 418 and system compromise 420 may combine to create the composite threat lateral movement 446. And data compromise 422 and data egress 424 may combine to create the composite threat data exfiltration 448. All of the threats may combine to create an advanced persistent threat (APT) 450.

Figure 5:
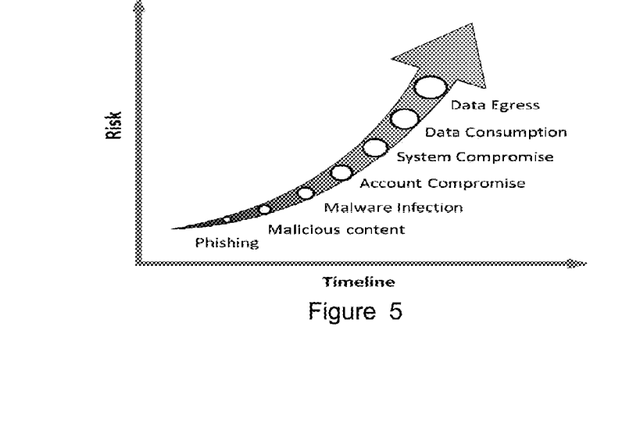
FIG. 5 illustrates a kill chain in accordance with the invention for early prediction of risks.

FIG. 5 illustrates the increasing risk posed by the sequence of singular threats of the kill chain of FIG. 4, and shows how the risk of damage exponentially increases as successive events are observed. As indicated in FIG. 5, a phishing threat represents a low level of risk and is a threat that can be detected early. Phishing 412 is also the first threat in the kill chain 410 of FIG. 4. Next in order of increasing risk as indicated in FIG. 5 are malicious content, malware infection, account compromise, system compromise, data consumption and finally data egress, and this is the order of threats shown in the kill chain 410 of FIG. 4. The significance of this order is that the earlier a threat can be detected and stopped, the lower the risk of significant compromise at a later stage.

For example, for a data exfiltration use case, e.g., threat 448 of FIG. 4, a relatively simple kill chain may comprise the combination of data consumption 422 and data egress 424 threats, as indicated. If the chance of anomalous data consumption is 0.8, for example, and is followed by a probability of data egress of 0.7, as calculated from the cumulative threat scores, $P_T$, as indicated above, then the risk of data exfiltration as determined by the composite risk score from the above equation is $R_C=(1+0.8)\cdot(1+0.7)-1=2.06$. A kill chain may be incomplete due to the possibility that one or more threat indicators have not been observed because of data issues or threat sensor thresholds, resulting in a lower threat score, but nevertheless can still indicate the possibility of an attack.

Figure 6:
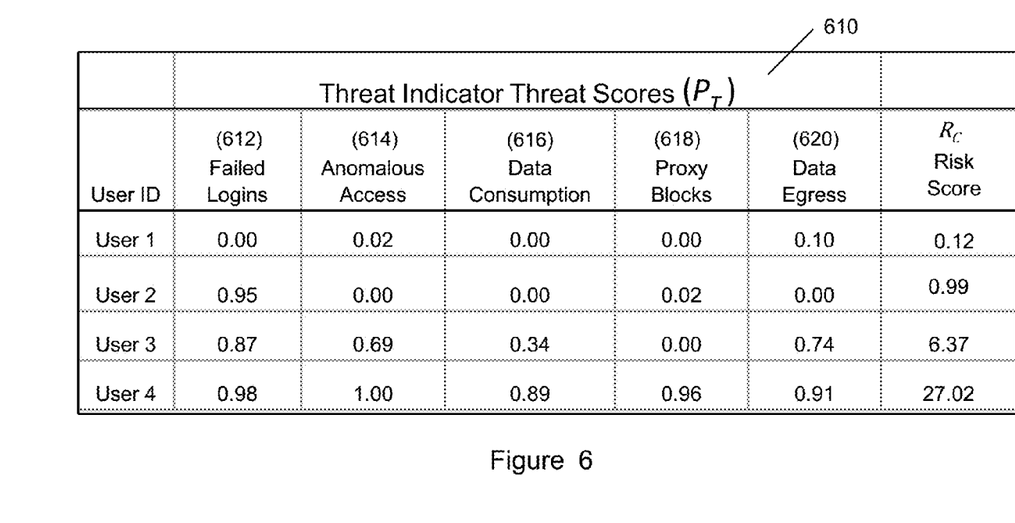
FIG. 6 illustrates an example in accordance with the invention of a kill chain for account hijacking and data exfiltration based upon observed threat events.

FIG. 6 illustrates an example of a longer kill chain for an account hijacking threat, and possible outcomes based upon observed events. The figure comprises a table that shows the calculated threat scores, $P_T$, for five different threat indicators (failed logins 612, anomalous access 614, data consumption 616, proxy blocks 618 and data egress 620) and composite risk scores, $R_C$, (calculated as described above) for four different users, User 1-User 4. The figure illustrates how risk amplification from events earlier in the kill chain can be an early predictor of an attack. In the example of FIG. 6, account hijacking of the account of User 4 could be stopped before data is exfiltrated because the first three threat scores 0.98, 1.00 and 0.89 generate a risk score, $R_C=6.48$, which is higher, for example, than the next highest total risk score for User 3 which had one weak threat score event (0.34) and one (0.00) missing completely.

Figure 7:
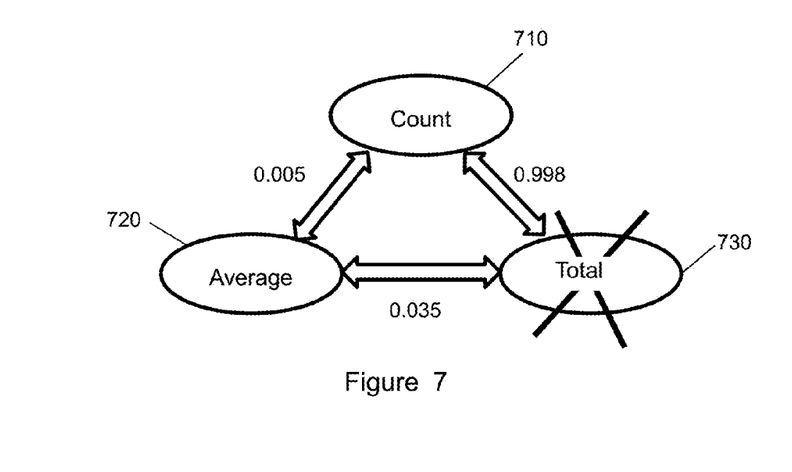
FIG. 7 illustrates an example of a method in accordance with the invention of testing pairwise dependency of behavioral indicators combined for creating a composite threat for risk evaluation scoring.

Behavioral indicators are independent measurements of an observable for a specific time series. For example, for customer service transactions, hourly and day of the week counts of transactions, as well as the amount of each transaction may be chosen. For monitoring database activity, the number of concurrent users per hour and daily volume of data consumed by each user may be employed for specific use cases. The proper time series may be selected based upon the volume of observations and the expected volatility, with preference given to time periods that reflect patterns of life, such as working hours or workdays. In combining behavioral indicators for a threat model, it is desirable for accurate risk scoring that the threat indicators selected be independent or at least not strongly correlated. Otherwise, since indicators combine to produce a composite risk score, dependent indicators can bias the resulting score and produce inaccurate results. Accordingly, prior to inclusion in a model, potential candidate indicators should be tested pairwise for dependency by determining their correlation using, for example, Pearson's correlation function. FIG. 7 illustrates a method in accordance with the invention for selecting behavioral indicators based upon their pairwise correlations for the example of customer service transactions.

Referring to FIG. 7, for customer service transactions, daily count 710, average amount 720 and the daily total amount 730 may be considered as possible indicators. Using Pearson's correlation function, a correlation coefficient, r, may be determined for each pair of indicators. In the example illustrated in the figure, as shown the correlation between count 710 and average amount 720 for an assumed a set of observations may be r=0.005; the correlation between average amount 720 and daily total 730 for the same set of observations may be r=0.035; and the correlation between count 710 and daily total 730 may be r=0.998. Any pair of indicators having a correlation coefficient r>0.5 may be considered suspect. In FIG. 7, count 710 and daily total 730 have a very high correlation coefficient (0.998) and, therefore, are highly dependent. In accordance with the invention, the indicator with the largest sum of correlation coefficients is preferably excluded as a threat indicator. In FIG. 7, the sum of correlation coefficients for daily total 730 is 0.998+0.035=1.033, which is the highest for the three indicators shown. Accordingly, as indicated in the figure, daily total 730 should be excluded as a threat indicator in the threat model for customer service transactions.

As indicated in FIG. 1, singular risks 112 and composite risks 130 attributed to a specific entity such as a user, an application or a system may be used to determine entity risks 140 for such entities. In accordance with the invention, these risks are preferably aggregated with static risk, i.e., risks associated with privileged access, high risk user groups and access to critical assets, and with inherent risk associated with such risk boosters as contractors and vendors, flight risk and termination notices, and unpatched vulnerabilities. Static risk scores, $R_S$, and inherent risk scores, $R_I$, may be different for each entity, e.g., user, and are determined by the organization based upon the particular scoring system it employs. The risk scores may be combined, after normalization, using the same risk amplification approach as described for the composite threat risk score, and used as a multiplier to a threat risk score, $R_T$, to yield an overall entity risk score, $R_E$, as follows:

$$R_E=R_T\cdot[(1+R_S)\cdot(1+R_I)-1]$$

In the account hijacking example above, if User 3 has a static risk $R_S=0.9$, which is a high risk, and an inherent risk, $R_I=0.3$, which is a medium risk, the overall risk of account hijacking for this user would be $6.37\cdot[(1+0.9)\cdot(1+0.3)-1]=9.36$. Both static and inherent risk scores have to be normalized before they can be used in the above relationship to calculate entity risk, $R_E$, and to compare the risk levels of different entities.

Figure 8:
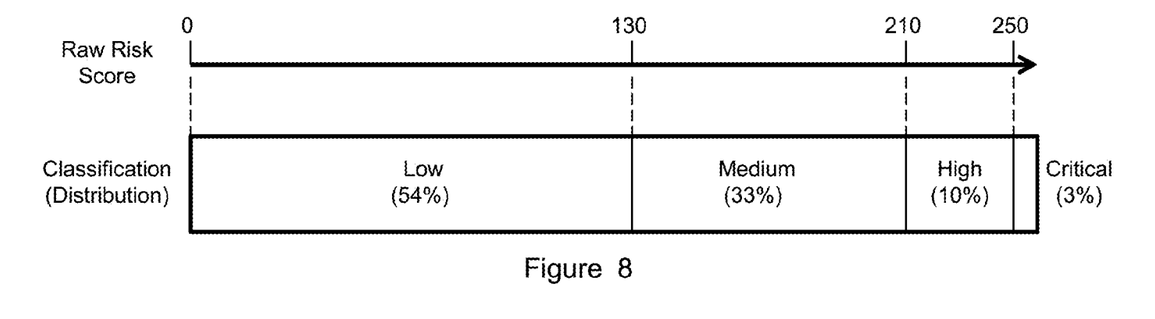
FIG. 8 illustrates a method in accordance with the invention for classifying raw risk scores into risk levels for an entity class.

In accordance with a preferred embodiment of the invention, normalization is preferably accomplished as a two-step process—classification and then normalization. First, raw risk scores may be classified by stack ranking the raw scores for each entity class (user, system and application). Next risk thresholds may be established to enable classifying the raw scores into discrete ranks or classification levels based upon percentages, where the discrete ranks reflect the enterprise's judgment as to the seriousness of the risks. Classification of risk scores by levels is useful for reporting and remediation within an entity class. Classification, however, may not enable risk scores of different entities to be compared or used directly to indicate an overall organizational risk. Accordingly, following classification raw scores are normalized by converting them to a normalized risk score. FIG. 8 illustrates the classification step of the process, and FIG. 9 illustrates the normalization step.

Referring to FIG. 8, assuming that an enterprise has raw risk scores for an entity distributed between 0 and 270, the enterprise may determine in its judgment that raw scores between 0-130 (54%) represent low risks; raw scores between 130 and 210 (33%) represent medium risks; raw scores between 210 and 250 (10%) represent high risks; and scores above 250 (3%) are classified as being critical risks. In other embodiments, different classification levels and other ways of ranking risks may be used.

Figure 9:
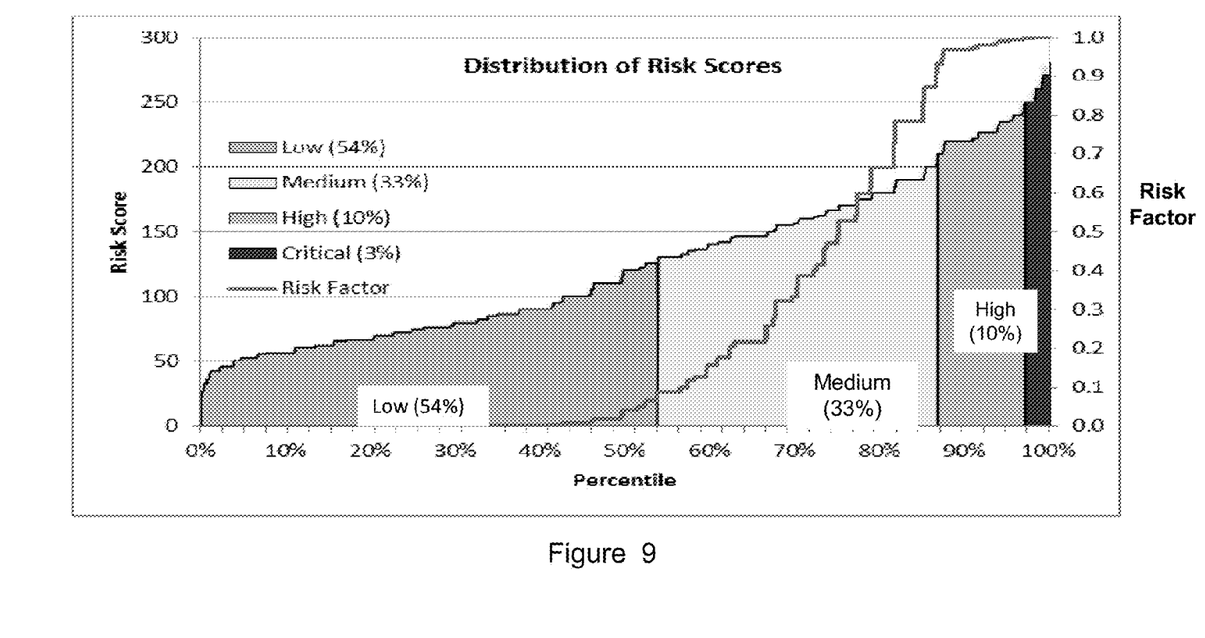
FIG. 9 illustrates a method in accordance with the invention for normalizing risk scores to enable combinations and comparisons.

FIG. 9 illustrates a process in accordance with an embodiment of the invention for converting these raw risk scores into normalized risk factor scores between 0 and 1.0. Normalization is a way of quantifying risks to enable comparison of risks not only between different users, but also with other entity classes such as systems and applications. Moreover, normalization enables entity risk scores for different entities to be combined to form a composite risk score for an enterprise, as well as enabling entity risks of different enterprises to be compared.

In a preferred embodiment, the invention normalizes risk factors by using a non-linear function that minimizes the impact of low risk entities, gradually increases in a medium risk range, and emphasizes the contribution to overall risk of high and critical risk entities to facilitate rapid detection of more serious attacks. Preferably, the invention uses a normal cumulative distribution function for normalization. This distribution, which is illustrated in FIG. 9 for the classification levels of FIG. 8, is defined as:

$$F(x) = \frac{1}{2}\left[1 + \text{erf}\left(\frac{x-\mu}{\sigma\sqrt{2}}\right)\right]$$

where $\mu$ and $\sigma$ are approximated using robust estimates from the top 50% of the distribution: $\mu = \text{median}_i(x_i)$, $\sigma = \text{median}_i(|x_i - \text{median}_j(x_j)|)$. This normalization formula is fairly stable in regards to a change in underlying raw risk scores, and parameters can be recalculated when the new risk vector is added or risk landscape has changed significantly.

Once entity risks are known, appropriate steps may be taken to mitigate threats, such as educating high risk users on safe browsing to protect against malware or restricting their access to critical assets. Additionally, risk indications may be further aggregated to determine the risks to a department, such as sales or engineering, or to a division or other group, as well as to the enterprise as a whole.

Organizational risk 150 (FIG. 1) may be determined as an aggregate of all entities aligned to a specific level of the hierarchy, and in accordance with the invention may be calculated for overall risk, for a specific entity class, or for a specific threat. In a preferred embodiment, organizational risk may be determined as the arithmetic average of the top 25% of the risk score values of entities to avoid losing track of a small percentage of non-zero risk entities. Accordingly, organizational risk as determined by the invention is sensitive to high-risk entities, but is also stable relative to changes such as adding or removing entities to the enterprise or to significant changes in entity risk score.

While the foregoing has been with respect to particular embodiments of the invention, it will be appreciated that changes to these embodiments may be made without departing from the principles of the invention, the scope of which is defined by the appended claims.

The invention claimed is:

1. A method of assessing a threat of an attack within a computer infrastructure of an enterprise, comprising:
   aggregating a plurality of singular direct threat indicators, each of which said direct threat indicators represents an event that indicates a known singular direct threat within said computer infrastructure with a plurality of singular behavioral threat indicators each of which represents an anomalous behavioral action that is indicative of a possible singular behavioral threat within said computer infrastructure to create a threat detection model that identifies combinations of different ones of said singular direct and singular behavioral threat indicators that represent different composite threats within said computer infrastructure;
   determining for each of said singular direct and behavioral threat indicators an associated risk factor for each type of threat represented by such threat indicators, said associated risk factor each being determined based upon a probability that a threat associated with such risk factor is an actual threat, and calculating corresponding risk scores for each said type of threat);
   identifying using said threat detection model combinations of said singular direct and behavioral threat indicators that correspond to composite threats;
   computing a composite threat risk score for each said composite threat as a weighted probability of the risk scores of said one or more said singular direct and behavioral threat indicators that in combination correspond to said composite threat; and
   detecting a likely attack due to said composite threat based upon a computed probability value of said composite threat risk score.

2. The method of claim 1, wherein said aggregating comprises assembling selected ones of said singular direct and behavioral threat indicators along a kill chain of attack to create said threat detection model with complex use cases across multiple threat domains and to amplify risks of attack to facilitate early detection of an attack.

3. The method of claim 2, wherein said assembling comprises forming said kill chain by rank ordering events associated with said singular direct and behavioral threat indicators in order of a probability of an attack, and wherein said detecting comprises providing an alert upon detecting that a composite risk score of a composite threat exceeds a predetermined value.

4. The method of claim 1, wherein said determining comprises assigning a risk factor to each of said singular threat indicators, said risk factor being assigned for a specific type of threat based upon a number of occurrences of events represented by said singular threat indicator.

5. The method of claim 1, wherein the probability of a singular behavioral threat indicator being a valid threat comprises a probability that an anomalous observable behavior associated with said singular behavioral threat indicator for a specific time series represents a threat.

6. The method of claim 1 further comprising testing said singular behavioral threat indicators for pairwise dependency, and excluding from said aggregation a singular behavioral threat indicator that has the highest sum of pairwise correlations with other singular behavioral threat indicators to avoid biasing a threat risk score.

7. The method of claim 1 further comprising aggregating a dynamic threat risk from singular and composite threat risks due to an entity comprising one or more of a user, an application and a system of said enterprise with a static risk based upon one or more of privileged access, high risk user group and critical enterprise asset, and with an inherent risk based upon one or more of non-employee personnel, user flight risk and system vulnerabilities to determine an entity risk.

8. The method of claim 7 further comprising combining a static risk score for said static risk with an inherent risk score for said inherent risk and said composite threat risk score to form an entity risk score for said entity, the entity risk score representing a threat risk to said enterprise attributed to said entity.

9. The method of claim 8, wherein said enterprise has entity classes corresponding to users, applications and system, and further comprising classifying said risk scores associated with threats into a predetermined number of discrete risk classification levels based upon raw risk score values to enable comparison with risk scores associated with other entities.

10. The method of claim 9, wherein said classifying comprises stack ranking raw risk scores, establishing threshold values for said discrete risk classification levels based upon percentages of distributions of said raw risk scores in said classification levels, and assigning said static risk and said inherent risk to classification levels based upon said static risk score and said inherent risk score, respectively.

11. The method of claim 8 further comprising normalizing said static risk score and said inherent risk score by determining normalized risk scores using a non-linear distribution function that minimizes the contribution of entities of said enterprise that have low risk, and maximizes the contribution of entities having risk classification levels corresponding to high risk and critical risk.

12. The method of claim 1, wherein said aggregating comprises assembling said singular threat indicators to create said threat detection model based upon a model for a particular industry of which the enterprise is a part.

13. The method of claim 12, wherein said enterprise comprises different entity classes at different hierarchical levels, and said method further comprises normalizing risk scores for said different entity classes at said different hierarchical levels to enable comparison between different entities.

14. The method of claim 13 further comprising determining an organizational risk for all entities at a specific hierarchical level of the enterprise as an arithmetic average of a percentage of top risk scores for entities at said specific hierarchical level.

15. A method of assessing threats with a computer infrastructure of an enterprise, comprising:
    determining a threat risk score for each of a plurality of direct threat indicators, each of which direct threat indicators represents a known direct threat, and for each of a plurality of behavioral threat indicators, each of which behavioral threat indicators represents an anomalous behavioral action that indicates a possible behavioral threat, said risk score being based upon risk factor values for each of said direct and behavioral threat indicators, said risk factor values being based upon a probability that a threat associated with a corresponding risk factor is an actual threat, and upon numbers of observed occurrences of events associated with said direct and behavioral threat indicators;
    creating a threat detection model that identifies composite threats as combinations of different direct and behavioral indicators by assembling different singular events and actions corresponding to said direct and behavioral threat indicators along a kill chain in order of progressively increasing risk of an actual attack to amplify risks along said kill chain for enhanced detection of an attack;
    computing composite threat risk scores for combinations of said direct and behavioral threat indicators along the kill chain that comprise different composite risks as a weighted probability of the risk scores of the combinations of the direct and behavioral threat indicators that form said different composite risks; and
    detecting an attack due to a composite threat based upon a computed probability of a composite risk score for such composite threat exceeding a predetermined value.

16. The method of claim 15 further comprising aggregating threat risk scores for said singular threats and said composite threat risk scores with normalized values of static risk scores and inherent risk scores for an entity of said enterprise to produce a normalized entity risk score for said entity that can be compared with a second normalized entity risk score for a second entity.

17. The method of claim 16 further comprising comparing said normalized entity risk score to a predetermined threshold value to predict the risk of an attack within the computer infrastructure.

* * * * *